J. B. CARROLL.
FILM UNWINDING APPARATUS.
APPLICATION FILED SEPT. 15, 1915.

1,190,262.

Patented July 11, 1916.
6 SHEETS—SHEET 1.

Witnesses:

Inventor:
John B. Carroll,
By David H. Fletcher,
Atty.

J. B. CARROLL.
FILM UNWINDING APPARATUS.
APPLICATION FILED SEPT. 15, 1915.
1,190,262.
Patented July 11, 1916.
6 SHEETS—SHEET 2.
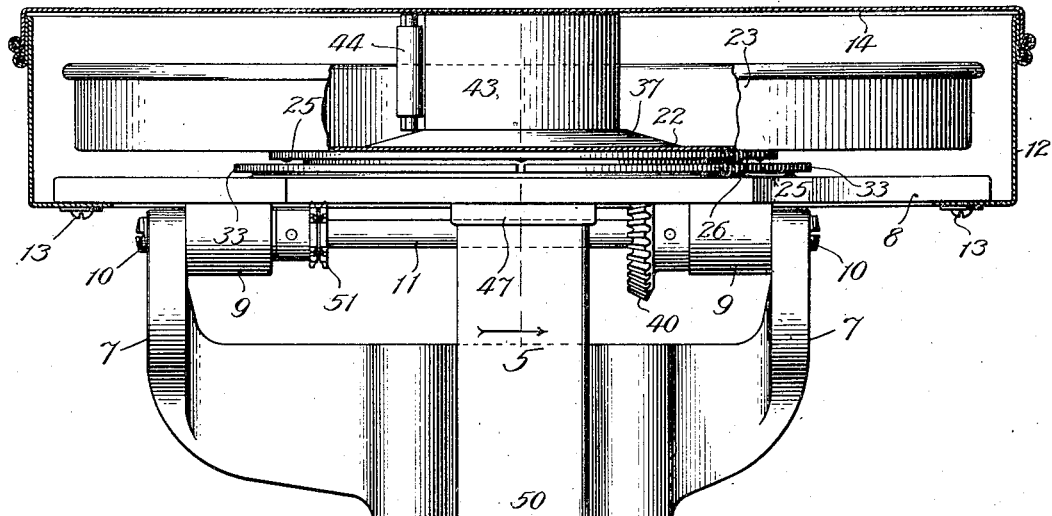
Fig. 2.
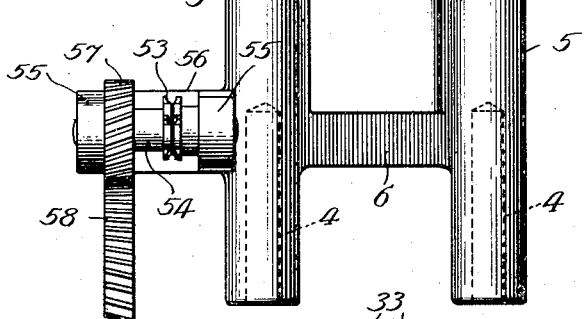
Fig. 3.
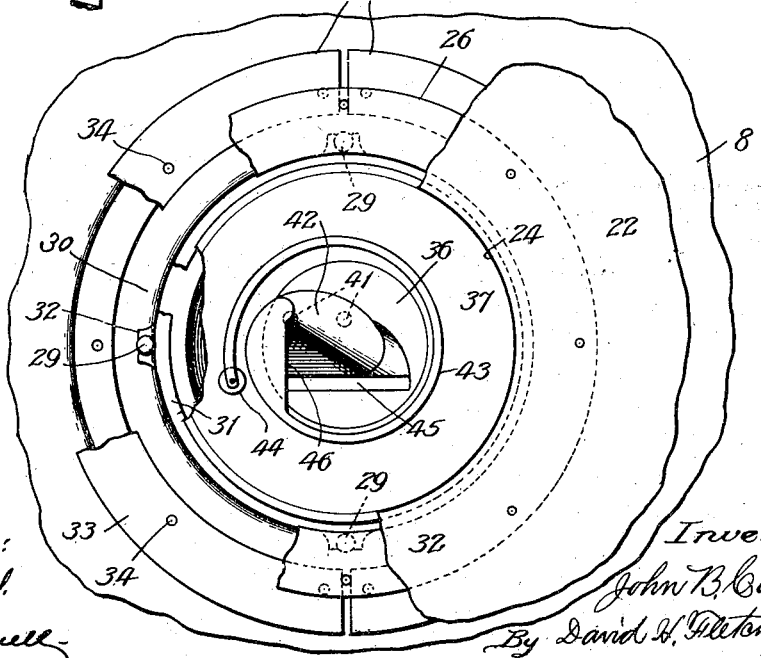
Witnesses:
Inventor:
John B. Carroll
By David H. Fletcher
Atty.

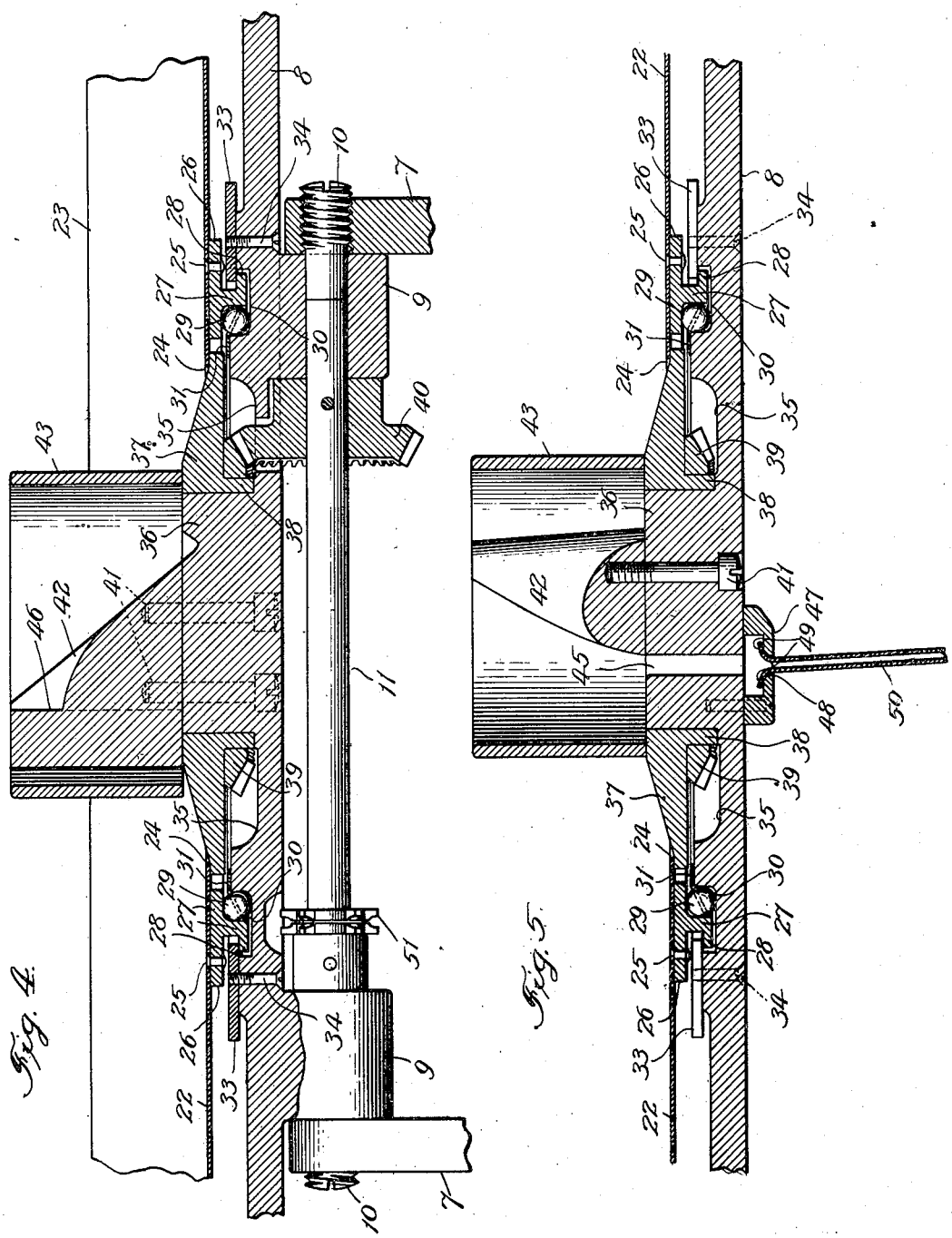

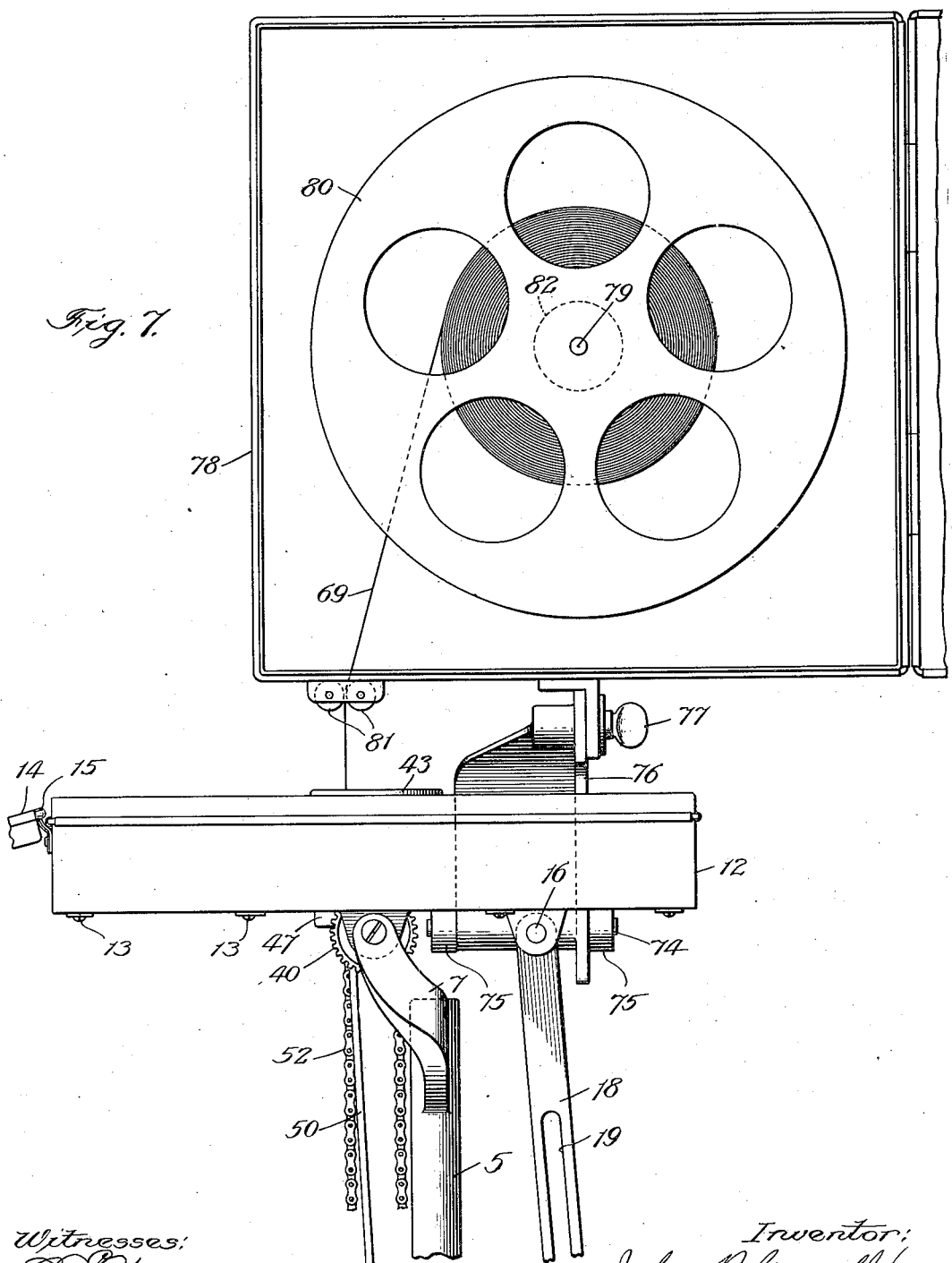

J. B. CARROLL.
FILM UNWINDING APPARATUS.
APPLICATION FILED SEPT. 15, 1915.
1,190,262.
Patented July 11, 1916.
6 SHEETS—SHEET 6.
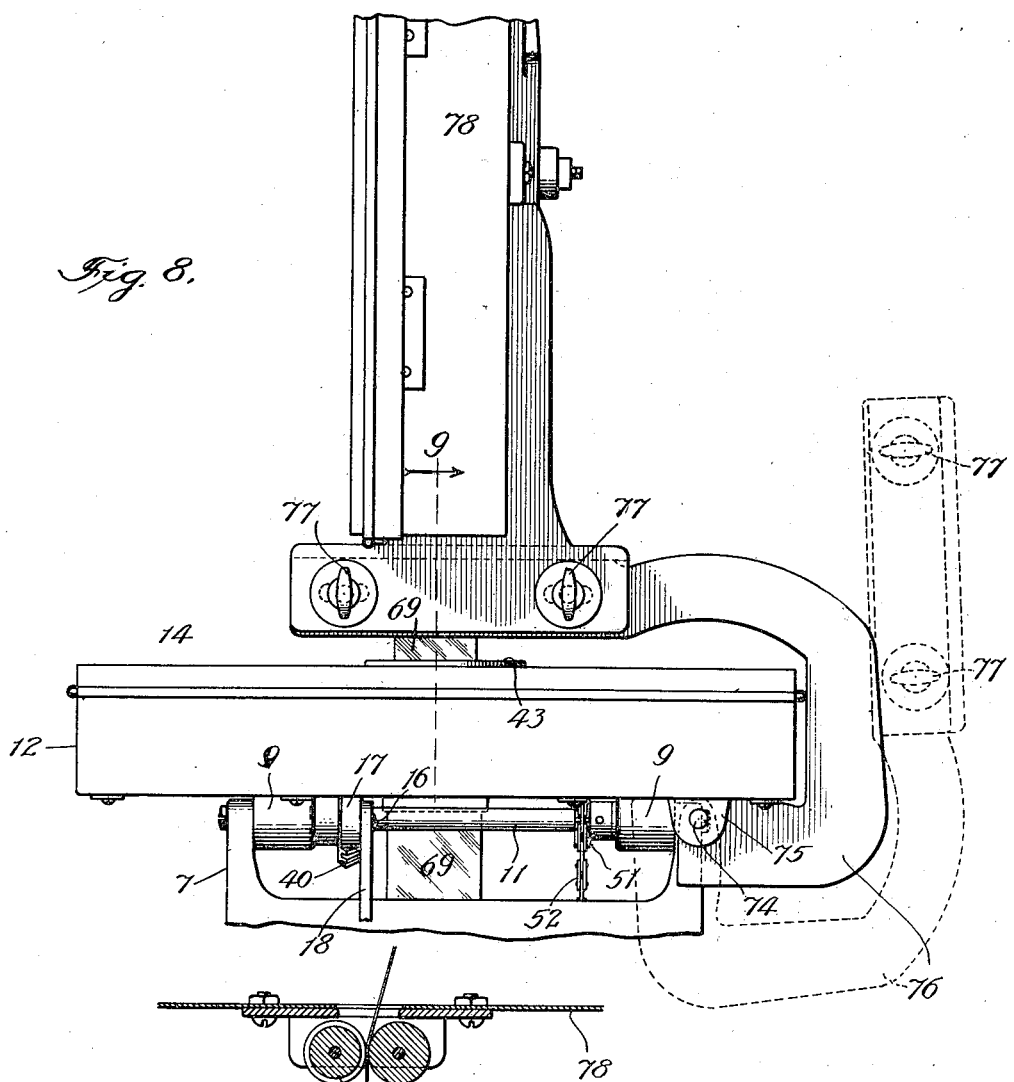
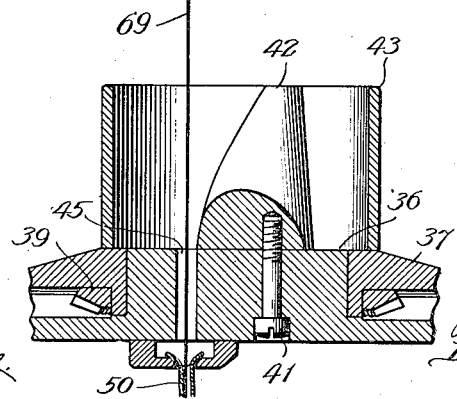
Witnesses:
Inventor:
John B. Carroll,
By David H. Fletcher,
Atty.

UNITED STATES PATENT OFFICE.

JOHN B. CARROLL, OF CHICAGO, ILLINOIS.

FILM-UNWINDING APPARATUS.

1,190,262.  Specification of Letters Patent.  Patented July 11, 1916.

Application filed September 15, 1915. Serial No. 50,817.

*To all whom it may concern:*

Be it known that I, JOHN B. CARROLL, a citizen of the United States, residing at Chicago, in the county of Cook and State of Illinois, have invented certain new and useful Improvements in Film-Unwinding Apparatus, of which the following is a description, reference being had to the accompanying drawings, forming a part of this specification, in which corresponding letters of reference in the different figures indicate like parts.

My invention relates to kinetoscopic films; and my object is to provide a simple, cheap and effective apparatus for unwinding a film from the center in such a way that it may again be placed directly upon the unwinding support, presented to the projector and unwound without having to undergo the usual preliminary operation of rewinding from the secondary or winding-reel in order to transpose it for proper repetition,—thereby saving time and avoiding risk and wear upon the film;—all of which is hereinafter described and definitely pointed out in the claims.

Figure 1:
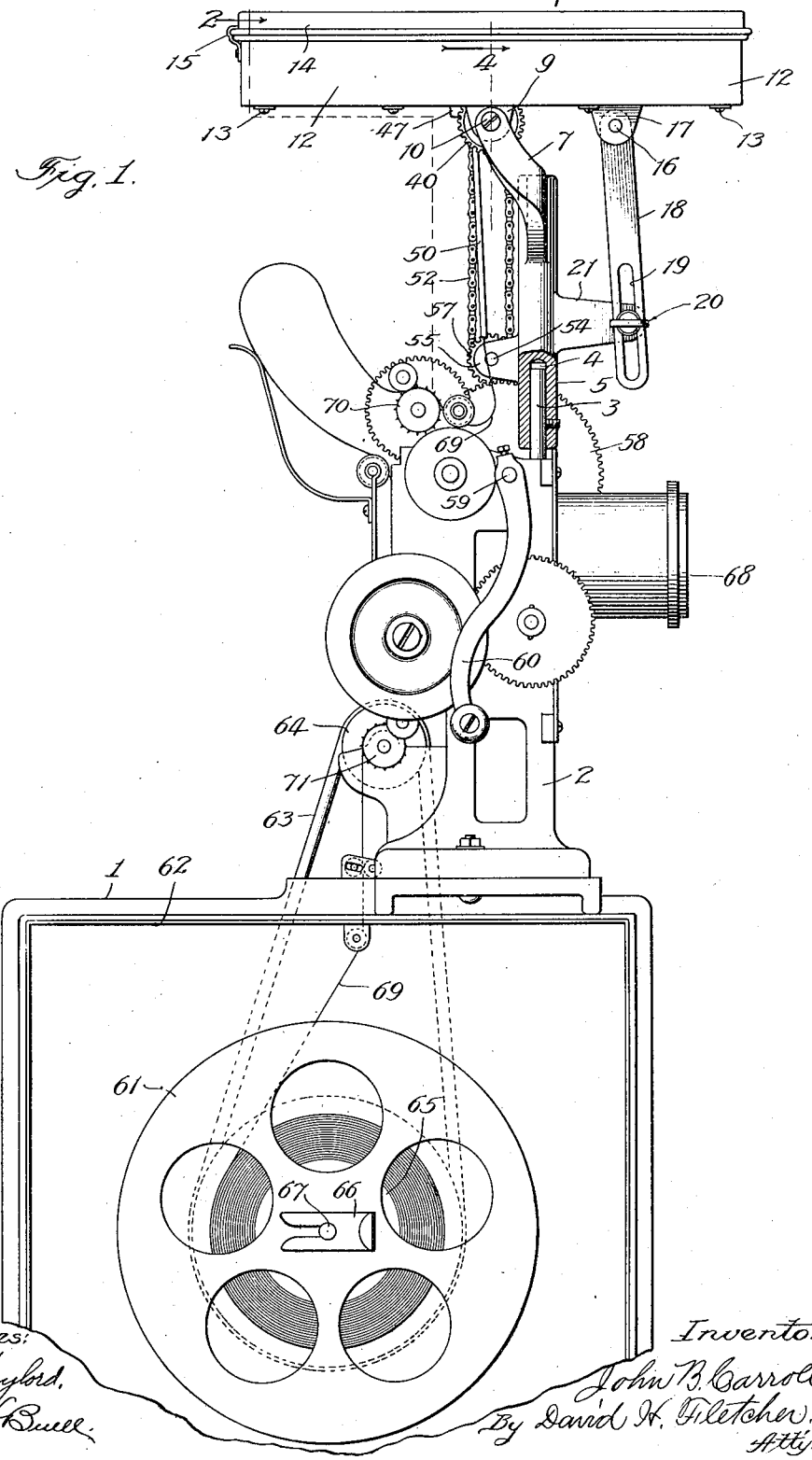
Figure 6:
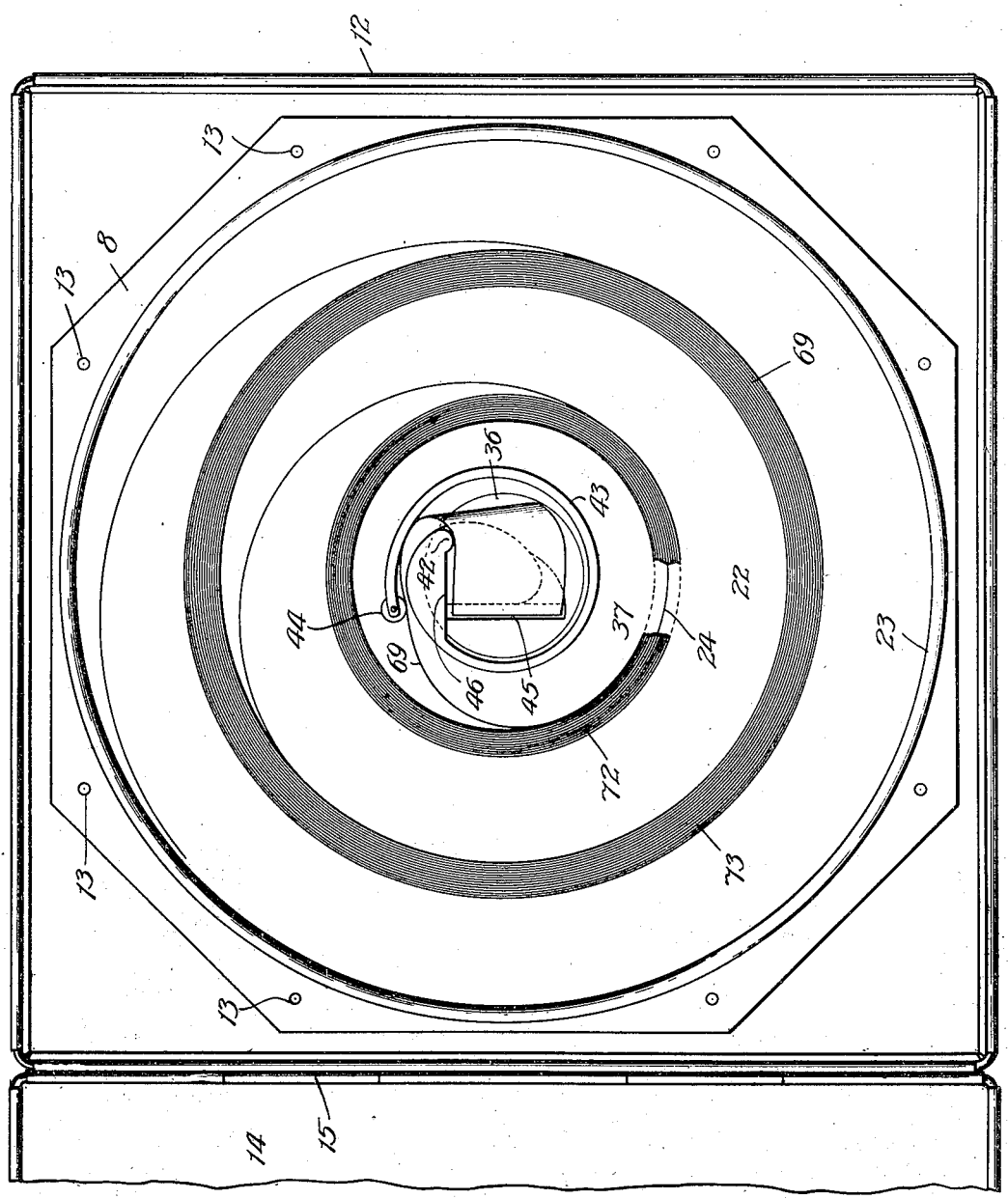

In the drawings, Figure 1 is a side elevation of a portion of a cinematographic projector embodying the features of my invention. Fig. 2 is an enlarged vertical section taken upon the line 2—, Fig. 1, viewed in the direction of the arrow there shown. Fig. 3 is a plan view of portions of the film supporting and guiding members, parts being broken away to show their coacting relation. Fig. 4 is an enlarged section taken upon the line 4—, Fig. 1, viewed in the direction indicated by the arrow. Fig. 5 is a section taken upon the line 5—, Fig. 2, viewed in the direction indicated by the arrow there shown. Fig. 6 is a plan view of the film supporting means, showing a film and the manner of its manipulation by the several supporting and guiding members. Fig. 7 is an elevation in detail showing a modified construction embodying means for unwinding the ordinary commercial reel in order to adapt the film for use in my improved unwinding apparatus. Fig. 8 is a view of the parts shown in Fig. 7, taken in a plane at right angles thereto, and Fig. 9 is a section in detail taken upon the line 9—, Fig. 8.

Referring to the drawings, 1 indicates the main frame portion of a cinematographic film device, and 2, the upper frame portion mounted thereon for supporting the usual projector, shutter, gears and sprocket mechanism for intermittently feeding a film past the light opening, all of which is old and well known in the art and need not be described. Formed upon or rigidly attached to the upper portion of the frame 2, are upwardly projecting studs 3, which are adapted to enter bores 4, shown in full lines in Fig. 1, and indicated in dotted lines in Fig. 2, formed in upright supports 5, connected by means of a web 6, and provided with laterally extended, upwardly bent arms 7, the whole comprising a supporting frame-member for a horizontally arranged metal plate or casting 8, Figs. 2 to 6 inclusive, which is provided with lugs 9, Figs. 1, 2 and 4, upon its under face into bores in which are projected trunnions 10, said trunnions being tapped through the upper ends of the arms 7, and extended far enough into the bores formed in said lugs to serve as pivots for the lugs; the remaining portions of said bores serving as bearings for the ends of a horizontal shaft 11, the purpose of which will be hereinafter explained. A rectangular casing 12, is rigidly attached to the part 8 by means of screws 13 in the bottom. Said casing is provided with a lid 14, which is hinged thereto at 15. It is often necessary to tilt the projector at an angle from the horizontal in order to properly locate the picture upon the screen. Such an adjustment would likewise tilt the part 8 and with it the casing; and it is to provide against such a contingency that the part 8, which should be kept level, is supported upon trunnions as described. The following described means is provided for its adjustment: jointedly attached at 16, Fig. 1, to a lug 17, upon the bottom of the plate 8, is a link 18, having a slot 19 therein through which is passed a thumb-screw 20, which is tapped into a rigid arm 21, extending outwardly from the frame. Said thumb-screw enables the link 18 to be adjusted for the purpose of leveling the casing; and when so adjusted, to be rigidly clamped in place.

Centrally located within the casing above the part 8, which forms a base therefor, is a main or primary annular film-support 22, preferably formed from sheet-metal, said support being provided with a vertical side wall 23, preferably circular in form. Said film support or pan, is cut away as shown at 24, to form a central opening for the reception of a secondary or auxiliary annular support as hereinafter described. Surrounding said central opening and rigidly attached to the bottom of the pan by means of rivets 25, is a ring 26, Figs. 2, 3, 4 and 5, adapted to form the upper member of a ball-bearing raceway. Said ring is provided between its edges with a downwardly extended annular portion 27. The ring 26 is supported upon balls 29 located within a circular groove or race-way 30, formed in the upper face of the plate 8, said balls being held in place at predetermined distances from each other by means of a loose ring or "cage" 31, having ball retaining fingers 32 thereon, between which the balls are loosely held. The main film-support 22, while free to rotate upon the ball-bearings, is held against tilting or displacement by means of split-rings 33, which are extended into the groove above the flange 28, and secured in place by means of screws 34.

An annular depression 35, is formed in the upper face of the part 8, which depression is concentric with but of smaller diameter than the race-way described. A central, upwardly extended journal-portion 36, is formed upon said plate upon which is journaled a disk-like member 37, Figs. 2 to 6 inclusive, forming an auxiliary film-support which is coaxial with the main support 22. Said part 37 is provided with a depending annular flange 38, upon which is rigidly mounted a beveled gear 39, the teeth of which are adapted to intermesh with those of a gear 40, upon the shaft 11, also shown in Fig. 1. The diameter of the disk member 37, is greater than that of the opening in the part 22. The inner part of said member which forms a hub, is flush with the top portion of upper face of the journal member 36, and is, by preference, downwardly inclined toward its periphery which is extended beneath the inner edge of the part 22, in close proximity thereto, but so adjusted that the two may be free to coact as film supports while rotating independently of each other for the purpose hereinafter stated. Rigidly attached to the upper face of the part 36, by means of screws 41, one of which is shown in full lines in Fig. 5, and both indicated in dotted lines in Figs. 3 and 4, is an upwardly extended, conoidal shaped guide member 42, one portion of the outer face of which is vertical and has formed thereon or rigidly attached thereto, a volute-shaped metal guide scroll 43, the walls of which are vertical or substantially so, and extend beyond the journal part 36, so as to partially overhang the disk 37. The outer end of said scroll-guide is preferably provided with a vertically arranged friction roller 44, spaced apart from the inner portion or convolution of the scroll, so as to provide for the free passage of a film between them.

Formed in the part 36, immediately adjacent to the base of the conoidal guide-member 42, is a film slot 45, one edge of which is flush with the base of said guide-member as more clearly shown in Figs. 3 and 5, while one end is flush with a straight vertical wall portion or shoulder 46, Figs. 3, 4 and 6, which is adapted to serve as a stop or guide for one edge of a film. Attached to the lower face of the part 8, by means of screws or otherwise, is an elongated hollow fitting 47, Figs. 1, 2 and 5, having a slot 48 therein in alinement with the slot 45, into which is loosely fitted or suspended by means of bent lugs 49, a flat tubular film conduit 50, of a size and shape to permit the free passage of a film therethrough, said conduit being so connected as to provide for a limited swinging movement thereof to provide for a ready adjustment of a film.

The shaft 11 has mounted thereon a sprocket-wheel 51, which is operatively connected by means of a sprocket-chain 52, with a like sprocket-wheel 53, shown in Fig. 2, upon a shaft 54, journaled in bearings formed in lugs 55, extending outwardly from a bracket 56, which is integral with the support 5. A gear 57 is keyed to the shaft 54 and adjusted to mesh with a gear 58, keyed to the main driving shaft 59, Fig. 1, of the machine, which is adapted to be driven by means of the usual crank 60.

Aside from the shaft 54 and gear 57, the several gears and other movable parts shown in Fig. 1, are those of the ordinary cinematographic machine, including a winding reel 61, Fig. 1, journaled within a casing 62, and adapted to be positively driven by means of a belt 63, connected with a driving pulley 64, in a well known way. The only differences between said reel and those ordinarily employed, are that it is provided with an enlarged central hub 65, upon which the film is wound, the diameter of said hub being greater than that of the central guide-scroll 43, to permit said scroll to enter the central opening of the film when the latter is placed in position for unwinding. A further distinction is that the outer disk of the reel is made removable, being held in place against the hub by means of a detachable clip 66, which is held by frictional contact within a groove formed in the spindle 67, upon which it is placed, so as to bear against the outer disk which is mounted upon said spindle in contact with the hub.

Having thus described the several features of construction embodying the invention, I will now explain its operation. After adjusting the machine at the proper angle so that the lens 68, may serve to properly locate the picture as projected, the casing 12, should be leveled by means of the adjusting parts 18 and 20. The coiled film 69 is laid loosely within the tray or main film-support 22, the end of the inner convolution thereof being drawn inwardly, over the disk 37, threaded into the space between the friction roller 44 and the inner part of the stationary volute-shaped guide member 43, given a quarter twist over the conoidal-shaped member 42, as shown in Fig. 6, passed downwardly through the slot 45, and guide-tube 50, into engagement in the usual well-known way with feed sprocket wheels 70 and 71, Fig. 1, and the ordinary guiding mechanism to the winding-reel 61. Were the tray to extend inwardly to the stationary part or film guide and the film drawn directly therefrom into the guideway at a fixed rate of speed, as it would be, the tendency would be to accelerate the speed of the tray until disarrangement of the film would result. Moreover, the inertia of the tray at the beginning would tend to wind the inner convolutions of the film around the stationary guide so tightly as to arrest or interfere with its proper movement. The positively rotated disk 37 is intended to overcome both of these difficulties. While maintaining a fixed rate of speed, its manner of actuating the film through the influence of friction, provides for any variation which may occur. The film supporting tray or part 22, is normally at rest and tends to remain so. When started, the frictional action of the disk 37, tends to draw the convolutions toward the center and loosen up the coil. This will occur in somewhat rapid succession until a number of coils will be caused to assemble by themselves as shown at 72, while other may remain in the position indicated at 73. Some of the coils 72, will rest near the inner edge of the annular support 22 and some upon the disk 37.

In order to accomplish the result above described, it is essential that the speed of the disk, owing to the fact that it tends to actuate the film through friction only and hence is subjected to more or less slipping of the film thereon, should exceed that of the feed. I have found in practice that when the speed of the surface of the disk is approximately twice that of the peripheral speed of the feed sprockets, the results are entirely satisfactory and hence I would recommend an average surface speed of the disk of substantially twice that of the feed.

The inertia of the film support 22 will be gradually overcome as a result of the frictional action of the moving film thereon which tends to rotate it; and it will be caused to revolve at such a rate as will enable the film to be properly unwound without accelerating the speed of the support as would be the result owing to the progressive difference in length of the successive convolutions. The frictional action of the disk 37, upon the film is in the nature of a governor and enables the several convolutions to adjust themselves in loose relation to each other so that neither undue tightening nor distortional displacement will occur and the film will be passed through all stages of unwinding and past the guiding means in a free and natural manner and without friction upon the stationary guiding parts.

Inasmuch as the ordinary commercial reel is provided with a small hub and is so constructed that the film cannot be readily removed therefrom except by unwinding, I have provided means whereby it may be unwound therefrom and led directly through the slot 45, and connected with the sprocket feeding mechanism and winding reel with a view of thereafter utilizing the revoluble tray as described. Jointedly attached by means of a pin 74 to lugs 75, Figs. 7 and 8, formed upon the under face of the plate 8, is a bent arm 76, to the free end of which is detachably secured by means of thumb-screws 77, the usual casing 78, having a pivot-pin 79 therein for the support of the usual commercial reel 80. When in use the arm 76 is adapted to stand in the position shown in full lines in Figs. 7 and 8, in which case the film 69, is led downwardly between guide-rolls 81, directly through the film-slot 45, to the feeding mechanism and winding reel 61. It will be noted that the hub 65, of the reel 61, is much larger than that of the reel 80 which is indicated in dotted lines at 82, Fig. 7. The hub 65 is of such diameter that when the film is removed therefrom the central opening will be large enough to readily receive the guide member 43. As soon as the film is unwound from the eel 80, the arm 76 is tilted to the position indicated in dotted lines in Fig. 8, and the film is thereafter transferred to and unwound from the film supports within the casing 12.

I do not wish to be limited to the exact construction shown, inasmuch as it may be varied without departing from the spirit of the invention.

Having thus described my invention, I claim:

1. A film unwinding device, comprising, in combination, independent, annular revoluble film supports arranged one within the other to rotate around a common vertical axis, film guiding means located within the aperture of the inner support for guiding the inner convolution of a film to unwind it, and means for positively rotating said inner film support.

2. A film unwinding device comprising, in combination, independent annular revoluble, horizontally arranged coaxial film supports, central film guiding means located within the aperture of the inner support for guiding the inner convolution of a film downwardly to feeding means, and means for positively rotating said inner film support.

3. A film unwinding device, comprising, in combination, independent, annular film supports arranged to rotate around a common vertical axis, said supports being located substantially in a common plane, film guiding means situated within the aperture of the inner support for guiding the inner convolution of a film to feeding means, means for positively rotating said inner film support, a projector, positively actuated film feeding means therefor, and means for winding a film.

4. A film unwinding device, comprising in combination, main and auxiliary annular film supports, the latter being located within the central opening of the former, while both are independently rotatable around a common vertical axis, stationary supporting means therefor, a portion of which is located within the central opening of said auxiliary support, said portion having a film slot therein, guiding means for said portion for guiding a film from said film supports into said slot, means for rotating said auxiliary support and film feeding means.

5. A film unwinding device, comprising in combination, two annular revoluble film holders, one of which is located within the central opening of the other to rotate independently around a common vertical axis, a stationary support having a film slot therein within the circular opening of said inner film holder, film guiding means upon said stationary support arranged to guide the film from the inner convolution of the film coil into said film slot, film feeding means and means for winding said film.

6. A film unwinding device, comprising, in combination, a freely rotatable annular carrier for holding a portion of a coil of film, a positively driven rotatable annular supplemental coaxial carrier located within the central opening of said first named carrier for holding the inner coils of a film, central film guiding means for guiding the innermost convolution of a coil to a film-slot located therein to unwind a film from the center and means for feeding said film to pull it through said slot in operative relation to a projector.

7. A device of the class described for unwinding a coiled film from its center or inner convolution, comprising, in combination, a freely revoluble, annular coil-support adapted to be rotated by the friction of the coil thereon when the latter is unwound, a positively driven, revoluble, auxiliary annular coil support concentrically located within the aperture of said first named support to exert a frictional unwinding action upon a coil, stationary central guiding means comprising a volute-shaped scroll ending in a conoidal-shaped member in operative proximity to a film-slot, film feeding means and a receiving reel for rewinding the film.

8. A device for unwinding a coil film from its center or inner convolution, comprising, in combination, a freely revoluble, annular coil support adapted to be rotated by the friction of the coil thereon when the latter is unwound, a positively driven, revoluble, auxiliary annular coil-support concentrically located within the aperture of said first named support to exert a frictional unwinding action upon a coil, stationary central guiding means located in the aperture of said auxiliary coil support, consisting of a volute-shaped scroll surrounding a conoidal-shaped member leading to a film-slot, film feeding means and a jointedly suspended tubular film-guide interposed between said slot and said feeding means.

9. A film unwinding device, comprising in combination, independent annular revoluble coaxial film supports, one of which is located within the aperture of the other, centrally located film guiding means for guiding the inner convolution of a film to feeding means, feeding means, and means for positively rotating said inner film support at a speed exceeding that of the film feeding means.

10. A film unwinding device, comprising, in combination, main and auxiliary annular film supports arranged to rotate independently of each other around a common axis, the bottoms of said supports at the point of juncture being substantially in a common plane to permit a film to pass from the outer to the inner one without obstruction, film guiding means located within the aperture of the inner support for guiding the inner convolution of a film downwardly to feeding means, means for positively rotating said auxiliary film support while leaving the main one free to be independently actuated by the friction of the film thereon and feeding means in advance of said guiding means.

11. A device of the class described for unwinding a coiled film from its center or inner convolution, comprising in combination, a freely revoluble, annular coil support adapted to be rotated by the friction of the edge of the coil thereon when the latter is unwound, a positively driven, revoluble, auxiliary annular coil support concentrically located within the aperture of said first named support to exert a frictional unwinding action upon a coil, film guiding means located within the central opening of said positively driven support in operative proximity to a film-slot in said central opening, and film feeding means for feeding a film downwardly through said slot.

In testimony whereof, I have signed this specification in the presence of two subscribing witnesses, this 26th day of August, 1915.

JOHN B. CARROLL.

Witnesses:
　DAVID H. FLETCHER,
　JENNIE L. FISKE.